United States Patent
Shike et al.

(10) Patent No.: US 12,054,605 B2
(45) Date of Patent: Aug. 6, 2024

(54) VINYLIDENE FLUORIDE-BASED POLYMER COMPOSITION OBTAINED USING NON-FLUORINATED SURFACTANT AND PRODUCTION METHOD THEREFOR

(71) Applicant: Kureha Corporation, Tokyo (JP)

(72) Inventors: Aya Shike, Tokyo (JP); Yoshiyuki Nagasawa, Tokyo (JP); Yasuhiro Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 514 days.

(21) Appl. No.: 17/593,660

(22) PCT Filed: Mar. 16, 2020

(86) PCT No.: PCT/JP2020/011498
§ 371 (c)(1),
(2) Date: Sep. 22, 2021

(87) PCT Pub. No.: WO2020/203230
PCT Pub. Date: Oct. 8, 2020

(65) Prior Publication Data
US 2022/0177689 A1    Jun. 9, 2022

(30) Foreign Application Priority Data

Mar. 29, 2019   (JP) ................. 2019-068926

(51) Int. Cl.
*C08L 27/16*   (2006.01)
*C08F 2/30*   (2006.01)
*C08F 214/22*   (2006.01)

(52) U.S. Cl.
CPC ............... *C08L 27/16* (2013.01); *C08F 2/30* (2013.01); *C08F 214/225* (2013.01)

(58) Field of Classification Search
None
See application file for complete search history.

(56) References Cited

U.S. PATENT DOCUMENTS

| | | | |
|---|---|---|---|
| 8,809,471 B2 | 8/2014 | Amin-Sanayei et al. | |
| 2004/0171736 A1 | 9/2004 | Dadalas et al. | |
| 2007/0082993 A1* | 4/2007 | Amin-Sanayei | C08F 214/22 524/386 |
| 2007/0135546 A1* | 6/2007 | Amin-Sanayei | C08F 14/18 524/386 |
| 2008/0221244 A1 | 9/2008 | Sawauchi et al. | |
| 2012/0142858 A1 | 6/2012 | Amin-Sanayei et al. | |
| 2013/0345381 A1 | 12/2013 | Amin-Sanayei et al. | |
| 2014/0005325 A1 | 1/2014 | Amin-Sanayei et al. | |
| 2018/0030182 A1 | 2/2018 | Jochum et al. | |

FOREIGN PATENT DOCUMENTS

| | | | |
|---|---|---|---|
| CN | 101223228 A | 7/2008 | |
| CN | 101341179 A | 1/2009 | |
| CN | 101547966 A | 9/2009 | |
| CN | 101553528 A | 10/2009 | |
| DE | 603 01 322 T2 | 6/2006 | |
| EP | 3604363 A1 | 2/2020 | |
| JP | 2006-523758 A | 10/2006 | |
| JP | 2007-197721 A | 8/2007 | |
| JP | 2010-512430 A | 4/2010 | |
| JP | 5112303 B2 | 1/2013 | |
| JP | 5410987 B2 | 2/2014 | |
| JP | 2014-508209 A | 4/2014 | |
| JP | 2014-508210 A | 4/2014 | |
| WO | 2006135543 A2 | 12/2006 | |
| WO | WO 2007/120348 A1 | 10/2007 | |
| WO | 2008073685 A1 | 6/2008 | |
| WO | WO 2008/073686 A1 | 6/2008 | |
| WO | WO-2013180236 A1 * | 12/2013 | .......... C08F 214/247 |
| WO | WO 2016/149238 A1 | 9/2016 | |
| WO | 2018/179696 A1 | 10/2018 | |
| WO | WO 2019/014662 A1 | 1/2019 | |

OTHER PUBLICATIONS

Japanese Office Action for Japanese Application No. 2021-511383, dated Jul. 12, 2022, with an English translation.
Extended European Search Report issued Apr. 4, 2022, in European Patent Application No. 20784413.5.
International Search Report for International Application No. PCT/JP2020/011498, dated May 26, 2020.

* cited by examiner

*Primary Examiner* — Richard A Huhn
(74) *Attorney, Agent, or Firm* — Birch, Stewart, Kolasch & Birch, LLP

(57) ABSTRACT

The vinylidene-fluoride-based polymer composition according to the present invention comprises a vinylidene-fluoride-based polymer and a specific surfactant and contains no fluorinated surfactant, wherein the specific surfactant is contained in an amount of 10 ppm or larger but less than 100 ppm in terms of mass ppm of the solid components of the composition and has an HLB value of 10 or greater. The method for producing a vinylidene-fluoride-based polymer according to the present invention comprises emulsion-polymerizing specific monomers in an aqueous medium in the presence of a specific emulsifier and an initiator without using any fluorinated surfactant, the use amount of the emulsifier being 8.5 ppm or larger but less than 100 ppm in terms of mass ppm of the monomers.

13 Claims, No Drawings

VINYLIDENE FLUORIDE-BASED POLYMER COMPOSITION OBTAINED USING NON-FLUORINATED SURFACTANT AND PRODUCTION METHOD THEREFOR

TECHNICAL FIELD

The present invention is related to a vinylidene fluoride-based polymer composition using a non-fluorinated surfactant and a production method therefor.

BACKGROUND ART

As methods of producing vinylidene fluoride-based polymer particles using vinylidene fluoride as a main raw material, suspension polymerization, emulsion polymerization, soap-free emulsion polymerization, mini-emulsion polymerization, seeded emulsion polymerization, and solution polymerization have been known. Among these, emulsion polymerization is a polymerization method that can provide a latex, which has polymer particles dispersed in a medium, by performing a polymerization reaction through mixing, in a medium such as water, a monomer that is hardly soluble in the medium, and an emulsifier (surfactant) and then adding a polymerization initiator that is soluble in the medium. Here, if the emulsifier is not appropriate, the polymer particles may be aggregated during the polymerization reaction or after completion of the polymerization or stability of the latex may be poor, and thus it is important to select an appropriate emulsifier.

In a case of emulsion polymerization of a vinylidene fluoride-based polymer, to obtain stable latex, fluorinated surfactants have been used as an emulsifier, and among these, perfluorooctanoic acid (PFOA) has been widely used. However, use of a fluorinated surfactant is restricted in consideration of the environment, and a surfactant that contains no fluorine atom has been demanded.

Patent Documents 1 and 2 describe that stable latex can be obtained by using from 100 ppm to 2% of a non-fluorinated surfactant containing, for example, polyethylene glycol segments, relative to the weight of the solid content of the polymer.

CITATION LIST

Patent Document

Patent Document 1: JP 5410987 B
Patent Document 2: JP 5112303 B

SUMMARY OF INVENTION

Technical Problem

However, according to the study of the present inventors, it was found that latex based on the technologies in the related art tends to cause foaming during use and thus handleability tends to be deteriorated, and in the production method based on the technologies in the related art, stability of latex tends to be poor and yield also tends to be low.

An object of the present invention is to provide a vinylidene fluoride-based polymer composition that achieves excellent handleability because foaming is less likely to occur during use and that contains no fluorinated surfactant, and a method of producing a vinylidene fluoride-based polymer that can provide a vinylidene fluoride-based polymer in high yield without using a fluorinated surfactant while excellent polymerization stability is maintained.

Solution to Problem

As a result of diligent research to solve the problem described above, the present inventors surprisingly found that the problem described above can be solved by setting the used amount of a surfactant containing a segment of polyethylene glycol and a segment of polypropylene glycol and having a predetermined range of HLB value to be less than the lower limit of the essential used amount in technologies in the related art, and thus completed the present invention.

That is, the vinylidene fluoride-based polymer composition according to an embodiment of the present invention contains a vinylidene fluoride-based polymer and a surfactant,
the surfactant containing a segment of polyethylene glycol and a segment of polypropylene glycol,
a content of the surfactant being 10 ppm or greater and less than 100 ppm in terms of mass relative to a solid content of the vinylidene fluoride-based polymer composition, and
an HLB value of the surfactant being 10 or greater, but
the vinylidene fluoride-based polymer composition containing no fluorinated surfactant.

The weight average molecular weight of the surfactant is preferably 2500 or less.

The vinylidene fluoride-based polymer is preferably a vinylidene fluoride-based copolymer containing a structural unit derived from vinylidene fluoride and a structural unit derived from a fluorine-containing alkyl vinyl compound, and
a content of the structural unit derived from vinylidene fluoride is preferably 60 mass % or greater and less than 100 mass % relative to a total amount of structural units in the vinylidene fluoride-based copolymer.

The structural unit derived from a fluorine-containing alkyl vinyl compound is preferably at least one selected from the group consisting of structural units derived from hexafluoropropylene, structural units derived from tetrafluoroethylene, and structural units derived from chlorotrifluoroethylene.

The vinylidene fluoride-based polymer preferably contains a structural unit derived from a compound represented by Formula (1).

[Chem. 1]

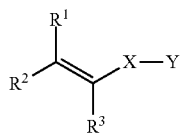

(1)

In Formula (1), $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

The method of producing a vinylidene fluoride-based polymer according to an embodiment of the present invention includes emulsion polymerization of a monomer in a water-based medium in the presence of an emulsifier and an initiator without using any fluorinated surfactant,
the monomer containing vinylidene fluoride and containing or not containing at least one selected from the group consisting of fluorine-containing alkyl vinyl compounds and compounds represented by Formula (1) above,
the emulsifier being a surfactant containing a segment of polyethylene glycol and a segment of polypropylene glycol, and
a used amount of the emulsifier being 8.5 ppm or greater and less than 100 ppm in terms of mass relative to an amount of the monomer.

Advantageous Effects of Invention

According to embodiments of the present invention, a vinylidene fluoride-based polymer composition that achieves excellent handleability because foaming is less likely to occur during use and that contains no fluorinated surfactant, and a method of producing a vinylidene fluoride-based polymer that can provide a vinylidene fluoride-based polymer in high yield without using a fluorinated surfactant while excellent polymerization stability is maintained can be provided.

DESCRIPTION OF EMBODIMENTS

Vinylidene Fluoride-Based Polymer Composition
The vinylidene fluoride-based polymer composition according to an embodiment of the present invention contains a vinylidene fluoride-based polymer and a surfactant. The components contained in the composition will be described below. Note that, the composition does not contain a fluorinated surfactant from the perspective of, for example, environmental damage reduction.
Vinylidene Fluoride-Based Polymer
The vinylidene fluoride-based polymer is not particularly limited as long as the vinylidene fluoride-based polymer contains a structural unit derived from vinylidene fluoride, and may be a vinylidene fluoride-based polymer formed from only a structural unit derived from vinylidene fluoride or may be a vinylidene fluoride-based copolymer formed from a structural unit derived from vinylidene fluoride and a structural unit derived from a compound copolymerizable with vinylidene fluoride. One type of vinylidene fluoride-based polymer may be used alone, or two or more types of vinylidene fluoride-based polymers may be used in combination.

The compound copolymerizable with vinylidene fluoride is not particularly limited, and examples thereof include fluorine-containing alkyl vinyl compounds and compounds represented by Formula (1). One type of the compound copolymerizable with vinylidene fluoride may be used alone, or two or more types of the compounds copolymerizable with vinylidene fluoride may be used in combination.

[Chem. 2]

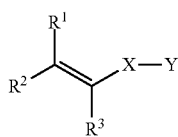

(1)

In Formula (1), $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

The fluorine-containing alkyl vinyl compound is not particularly limited, and examples thereof include hexafluoropropylene, tetrafluoroethylene, chlorotrifluoroethylene, trifluoroethylene, and fluoroalkyl vinyl ether. From the perspective of copolymerizability with vinylidene fluoride, hexafluoropropylene, tetrafluoroethylene, and chlorotrifluoroethylene are preferred.

For $R^1$, $R^2$, and $R^3$ above, examples of the alkyl group having from 1 to 5 carbons include a methyl group, an ethyl group, a propyl group, and an isopropyl group. $R^1$ is preferably a hydrogen atom, a methyl group, or a methoxycarbonyl group, and more preferably a hydrogen atom or a methoxycarbonyl group. $R^2$ and $R^3$ are preferably each independently a hydrogen atom or a methyl group, and are more preferably each independently a hydrogen atom.

The number of atoms present in a shortest molecular chain that links two moieties bonded to X described above is from 1 to 20, preferably from 1 to 14, and more preferably from 1 to 9. Examples of the atom constituting such a molecular chain include a carbon atom and a heteroatom. Examples of the heteroatom include an oxygen atom, a nitrogen atom, and a sulfur atom, and from the perspective of copolymerizability with vinylidene fluoride, an oxygen atom is preferred. Specifically, for example, in a case where the compound represented by Formula (1) is acryloyloxyethyl succinic acid, X is represented by —CO—O—(CH$_2$)$_2$—O—CO—(CH$_2$)$_2$—, thus the shortest molecular chain that links two moieties bonded to X described above is represented by —C—O—C—C—O—C—C—C—, and thus the number of atoms present in the molecular chain is 8. As described above, the number of atoms present in the molecular chain does not include the numbers of hydrogen atoms bonded as side chains to the atoms present in the molecular chain, oxo groups (i.e., =O), and other atoms in other substituents. Note that examples of the atom constituting the side chains include a carbon atom, a hydrogen atom, and a heteroatom. The heteroatom constituting the side chain is the same as heteroatoms constituting the molecular chain.

In a case where X described above is the atomic group, the molecular weight of the atomic group is 500 or less, and preferably 495. The lower limit of the molecular weight of the atomic group is not particularly limited and, for example, may be 14 or greater.

The compound represented by Formula (1) is not particularly limited, and examples thereof include acrylic acid, methacrylic acid, fumaric acid, maleic acid, citraconic acid, phthalic acid, monomethyl fumarate, monoethyl fumarate, monomethyl maleate, monoethyl maleate, monomethyl citraconate, monoethyl citraconate, monomethyl phthalate, monoethyl phthalate, acryloyloxypropyl succinic acid, acryloyloxyethyl succinic acid, methacryloyloxyethyl succinic acid, methacryloyloxypropyl succinic acid, 2-carboxyethyl acrylate, 2-carboxyethyl methacrylate, acryloyloxyethyl phthalic acid, methacryloyloxyethyl phthalic acid, N-carboxyethylacrylamide, N-carboxyethylmethacrylamide, carboxyethylthioacrylate, carboxyethylthiomethacrylate, vinyl carboxymethyl ether, vinyl carboxyethyl ether, 2-hydroxyethyl acrylate, 2-hydroxypropyl acrylate, 2-hydroxyethyl methacrylate, and 2-hydroxypropyl methacrylate. From the perspective of copolymerizability with vinylidene fluoride, acrylic acid, monomethyl maleate, acryloyloxypropyl succinic acid, and acryloyloxyethyl succinic acid are preferred.

Examples of the vinylidene fluoride-based copolymer containing a structural unit derived from vinylidene fluoride and a structural unit derived from a compound copolymerizable with vinylidene fluoride include a vinylidene fluoride-based copolymer containing a structural unit derived from vinylidene fluoride and a structural unit derived from a fluorine-containing alkyl vinyl compound, and
the content of the structural unit derived from vinylidene fluoride is 60 mass % or greater and less than 100 mass % relative to a total amount of structural units in the vinylidene fluoride-based copolymer. The content may be 63 mass % or greater and 97 mass % or less, and may be 65 mass % or greater and 95 mass % or less.

In addition, examples of the copolymer include a vinylidene fluoride-based copolymer containing a structural unit derived from vinylidene fluoride and a structural unit derived from a compound represented by Formula (1); and a vinylidene fluoride-based copolymer containing a structural unit derived from vinylidene fluoride, a structural unit derived from a fluorine-containing alkyl vinyl compound, and a structural unit derived from a compound represented by Formula (1). For these vinylidene fluoride-based copolymers, the content of the structural unit derived from vinylidene fluoride may be the same to those described above. Furthermore, for these vinylidene fluoride-based copolymers, the content of the structural unit derived from a compound represented by Formula (1) may be more than 0 mass % and 1 mass % or less, 0.01 mass % or greater and 1 mass % or less, or 0.02 mass % or greater and 0.5 mass % or less, relative to the total amount of structural units in the vinylidene fluoride-based copolymer.

(Surfactant)

In the vinylidene fluoride-based polymer composition according to an embodiment of the present invention, the surfactant is, for example, derived from an emulsifier used during the production of the vinylidene fluoride-based polymer. The surfactant is not particularly limited as long as the surfactant contains a segment of polyethylene glycol and a segment of polypropylene glycol, and may be a nonionic surfactant, a cationic surfactant, an anionic surfactant, or an amphoteric surfactant. From the perspectives of achieving high surfactant performance in hard water, in a metal salt solution, in an acid solution, or in an alkaline solution, low foamability, low critical micelle concentration, low cost, and excellent availabilityease in acquisition, a nonionic surfactant is preferred. The nonionic surfactant is not particularly limited, and examples thereof include polyoxyethylene polyoxypropylene alkyl ether and polyoxyethylene polyoxypropylene glycol. From the perspective of, for example, handleability, a polyoxyethylene polyoxypropylene alkyl ether is preferred. One type of the surfactant may be used alone, or two or more types of the surfactants may be used in combination.

The content of the surfactant is, in terms of mass, 10 ppm or greater and less than 100 ppm, preferably 15 ppm or greater and 90 ppm or less, and more preferably 20 ppm or greater and 80 ppm or less, relative to the solid content of the vinylidene fluoride-based polymer composition. The vinylidene fluoride-based polymer composition having a surfactant content of less than 10 ppm is less likely to ensure good polymerization stability during production and tends to cause difficulties in production. When the content is more than 100 ppm, the resulting vinylidene fluoride-based polymer composition tends to have poor polymerization stability during production and tends to have poor handleability during use because foaming tends to occur.

Note that, in the present specification, the solid content of the vinylidene fluoride-based polymer composition refers to a component remained when the vinylidene fluoride-based polymer composition is dried at 80° C. for 3 hours. The concentration of the solid content of the vinylidene fluoride-based polymer composition is not particularly limited, and from the perspectives of, for example, handleability and stability of the composition, the concentration is preferably from 5 to 40 mass %, more preferably from 7 to 35 mass %, and even more preferably from 8 to 30 mass %.

In the present specification, the HLB value of the surfactant refers to an HLB value calculated by the Griffin's method. In general, in a case where an w/o type emulsion is obtained by emulsion polymerization, the HLB value of a surfactant used in the emulsion polymerization as calculated by the Griffin's method is preferably 0 or greater and 10 or less, and in a case where an o/w emulsion is obtained by the emulsion polymerization, the HLB value is preferably 10 or greater and 20 or less. For the vinylidene fluoride-based polymer composition according to an embodiment of the present invention, the HLB value of the surfactant is 10 or greater (i.e., 10 or greater and 20 or less), and preferably 10 or greater and 18 or less, from the perspectives of ensuring good polymerization stability during production and tendency to be obtained in a form of an o/w type emulsion.

The weight average molecular weight of the surfactant (hereinafter, also referred to as "Mw") is preferably 2500 or less, more preferably 2000 or less, and even more preferably 1700 or less. When the weight average molecular weight is 2500 or less, an aqueous solution of the surfactant can be even more easily handled because the viscosity tends to be low. Furthermore, when the weight average molecular weight is 2500 or less, the critical micelle concentration of the surfactant tends to be small, and the wettability of the surfactant on the obtained vinylidene fluoride-based polymer particle surfaces tends to be enhanced, aggregation of the polymer particles tends to be suppressed. The critical micelle concentration of the surfactant is lowered as the added number of moles of the polyethylene glycol segment becomes smaller. Furthermore, when the concentration of the surfactant is less than the critical micelle concentration and is as closer to the critical micelle concentration, the surfactant remarkably exhibits ability to reduce surface tension. Therefore, a smaller critical micelle concentration of the surfactant tends to enhance wettability on the vinylidene fluoride copolymer particle surfaces even when the content of the surfactant is less than 100 ppm. In the present specification, the critical micelle concentration refers to a surfactant concentration at a point of intersection of an approximate line A for the plot in a region A in a high concentration side where the surface tension does not change based on the concentration of the surfactant and an approximate line B for the plot in a region B that is adjacent to the region A and that is on a low concentration side than the region A when surface tension measured by the Wilhelmy method is plotted taking surfactant concentration as the horizontal axis and surface tension as the vertical axis. The critical micelle concentration of the surfactant at 25° C. is, for example, 0.001 mass % for EMULGEN LS-106, 0.002 mass % for EMULGEN LS-110, 0.004 mass % for EMULGEN LS-114, 1 mass % for Pluronic 31R1, 10 mass % or greater for Pluronic 25R2, and 0.008 mass % for Pluronic L101. The lower limit of the weight average molecular weight is not particularly limited and, for example, may be 200 or greater, 300 or greater, 500 or greater, or 1000 or greater.

In the present specification, the weight average molecular weight of the surfactant refers to a weight average molecular weight measured by gel permeation chromatography (GPC), calibrated with polystyrene standard, unless otherwise noted. Note that the weight average molecular weight of the surfactant can be calculated by the following equation based on the hydroxyl value of the surfactant. Note that the hydroxyl value is the amount in terms of milligram of potassium hydroxide required to neutralize acetic acid bonded to hydroxyl groups when 1 g of a sample is acetylated and, for example, can be measured in accordance with JIS K 0070.

$$\text{Weight average molecular weight} = (56.1 \times 1000/\text{hydroxyl value}) \times \text{average number of hydroxyl groups per 1 molecule of surfactant}$$

In a case of a nonionic surfactant of which the average number of hydroxyl groups per 1 molecule of surfactant is 1, such as polyoxyethylene polyoxypropylene alkyl ether, the hydroxyl value of the surfactant is preferably 20 mg KOH/g or greater, more preferably 25 mg KOH/g or greater, and even more preferably 30 mg KOH/g or greater. Furthermore, in a case of a nonionic surfactant of which the average number of hydroxyl groups per 1 molecule of surfactant is 2, such as polyoxyethylene polyoxypropylene glycol, the hydroxyl value of the surfactant is preferably 40 mg KOH/g or greaster, more preferably 45 mg KOH/g or greater, and even more preferably 50 mg KOH/g or greater. The hydroxyl value in the range described above tends to suppress aggregation of the polymer particles because the weight average molecular weight of the surfactant is allowed to be in a preferred range, easier handling is achieved because the viscosity tends to be low, and the wettability of the surfactant on the obtained vinylidene fluoride-based polymer particle surfaces tends to be enhanced.

Specific examples of the surfactant include "EMULGEN LS-100" series (available from Kao Corporation) from the perspective of handleability, availability, and price. More specific examples thereof include LS-110, LS-106, and LS-114.

Other Components

The vinylidene fluoride-based polymer composition according to an embodiment of the present invention may contain components besides the vinylidene fluoride-based polymer and the surfactant (hereinafter, also referred to as "other components") as long as the effect of the present invention is not impaired. Examples of such other components include pH regulators, anti-settling agents, dispersion stabilizers, wetting agents, anti-fungal agents, and corrosion inhibitors. Note that, in a case where the vinylidene fluoride-based polymer in the vinylidene fluoride-based polymer composition is obtained by the following production method according to an embodiment of the present invention, the vinylidene fluoride-based polymer composition may contain an initiator that remains unreacted, or the initiator may be removed properly from the composition.

Method of Producing Vinylidene Fluoride-Based Polymer

Examples of the method of producing the vinylidene fluoride-based polymer according to an embodiment of the present invention include suspension polymerization, emulsion polymerization, soap-free emulsion polymerization, mini-emulsion polymerization, seed emulsion polymerization, and solution polymerization, and among these, emulsion polymerization, mini-emulsion polymerization, and seed emulsion polymerization are particularly preferred.

Suspension polymerization is a polymerization method performed by dissolving an oil-soluble polymerization initiator in a water-insoluble monomer in water containing, for example, a suspending agent, followed by suspension and dispersion by mechanical agitation. In suspension polymerization, vinylidene fluoride-based polymer particles are obtained by allowing the polymerization to proceed in monomer droplets.

Emulsion polymerization is a type of radical polymerization. It is a polymerization method performed by mixing a medium such as water, a monomer that is hardly soluble in the medium, and an emulsifier, and adding a polymerization initiator that is soluble in the medium. In emulsion polymerization, a dispersion medium, a surfactant, and a polymerization initiator are used in addition to vinylidene fluoride and another compound.

Soap-free emulsion polymerization is an emulsion polymerization performed without using an ordinary emulsifier that is used in the above-described emulsion polymerization. In the vinylidene fluoride-based polymer particles obtained by soap-free emulsion polymerization, the emulsifier is not remained in the polymer particle.

Mini-emulsion polymerization is polymerization performed by refining monomer droplets into sub-micron size by applying a strong shearing force using, for example, an ultrasonic generator. In mini-emulsion polymerization, in order to stabilize the refined monomer droplets, a hardly-soluble substance, hydrophobe, is added. In ideal mini-emulsion polymerization, microparticles of the vinylidene fluoride-based polymer are obtained by polymerizing monomer droplets.

Seed emulsion polymerization is a polymerization performed by coating the fine particle obtained by the above-described polymerization method with a polymer formed from other monomers. In a dispersion of the microparticles, for example, vinylidene fluoride and other monomers, a dispersion medium, a surfactant, and a polymerization initiator are further used.

Solution polymerization is a polymerization performed by preparing a monomer solution in which a monomer is dissolved in a solvent and then adding a polymerization initiator that can be solved therein. In many cases, as the solvent, a solvent that is less likely to react with the monomer and the polymerization initiator is used.

The method of producing a vinylidene fluoride-based polymer according to an embodiment of the present invention includes emulsion polymerization of a monomer in a water-based medium in the presence of an emulsifier and an initiator without using any fluorinated surfactant, the monomer containing vinylidene fluoride and containing or not containing at least one selected from the group consisting of fluorine-containing alkyl vinyl compounds and compounds represented by Formula (1) above, the emulsifier being a surfactant containing a segment of polyethylene glycol and a segment of polypropylene glycol, and a used amount of the emulsifier being 8.5 ppm or greater and less than 100 ppm in terms of mass relative to an amount of the monomer. According to the production method described above, a vinylidene fluoride-based polymer can be obtained as a component in the vinylidene fluoride-based polymer composition according to an embodiment of the present invention. According to the production method described above, it is easy to obtain the vinylidene fluoride-based polymer in high yields of 85% or greater.

The water-based medium is not particularly limited, a known water-based medium can be used. From the perspectives in availability, handleability, and environmental damage, use of water is preferred.

For the emulsifier, the same applies as the surfactant explained in the description for the vinylidene fluoride-based polymer composition. The used amount of the emulsifier is, in terms of mass, 8.5 ppm or greater and less than 100 ppm relative to the amount of the monomer. By setting as described above, when the vinylidene fluoride-based polymer is obtained in a yield of 85 to 100%, the content of the surfactant in the obtained vinylidene fluoride-based polymer composition can be set in a range of, in terms of mass, 10 ppm or greater and less than 100 ppm relative to the solid content of the vinylidene fluoride-based polymer composition. One type of the emulsifier may be used alone, or two or more types of the emulsifiers may be used in combination.

The initiator is not particularly limited, and examples thereof include water-soluble peroxides, water-soluble azo compounds, or redox initiators. Examples of the water-soluble peroxide include ammonium persulfide and potassium persulfide. Examples of the water-soluble azo compound include azobisisobutyronitrile (AIBN) and azobismethylbutyronitrile (AMBN). Example of the redox initiator includes ascorbic acid-hydrogen peroxide. One type of the initiator may be used alone, or two or more types of the initiators may be used in combination. The used amount of the initiator is preferably from 0.01 to 5 parts by mass, and more preferably from 0.05 to 5 parts by mass, per 100 parts by mass total of the monomers.

The monomer is as described above, and the used amount of each monomer can be properly adjusted based on the ratio of structural units in the vinylidene fluoride-based polymer to be obtained by the production method according to an embodiment of the present invention.

In the production method according to an embodiment of the present invention, a chain transfer agent may be used to adjust the degree of polymerization of the obtained vinylidene fluoride-based polymer. Examples of the chain transfer agent include ethyl acetate, methyl acetate, diethyl carbonate, acetone, ethanol, n-propanol, acetaldehyde, propylaldehyde, ethyl propionate, and carbon tetrachloride.

In the production method according to an embodiment of the present invention, as needed, a pH regulator may be used. Examples of the pH regulator include an electrolyte substance having a buffer capacity such as sodium dihydrogen phosphate, disodium hydrogen phosphate, and potassium dihydrogen phosphate; and a basic substance such as sodium hydroxide, potassium hydroxide, barium hydroxide, calcium hydroxide, and ammonia.

In the production method according to an embodiment of the present invention, other optional components such as an anti-settling agent, a dispersion stabilizer, a corrosion inhibitor, an anti-fungal agent, and a wetting agent may be used, as necessary.

The added amount of these optional components is preferably from 5 ppm (in terms of mass) to 10 parts by mass, and more preferably from 10 ppm (in terms of mass) to 7 parts by mass, relative to 100 parts by mass total of the entire monomers used in the polymerization.

The polymerization conditions such as polymerization temperature and polymerization time when the emulsion polymerization is performed are not particularly limited and, for example, a known polymerization conditions may be employed. The polymerization temperature may be selected appropriately depending on, for example, the type of polymerization initiator. For example, the polymerization temperature may be set to from 0 to 120° C., preferably from 20 to 110° C., and more preferably from 40 to 100° C. Although the polymerization time is not particularly limited, the polymerization time is preferably from 1 to 24 hours considering productivity, for example.

According to the production method according to an embodiment of the present invention, in a case where the water-based medium is water, latex in which the vinylidene fluoride-based polymer particles are substantially uniformly dispersed in water can be obtained. The latex obtained as described above may be used as is. The latex may be pulverized by at least one method selected from, for example, salting-out, freeze milling, spray drying, and freeze drying, and used. The pulverized vinylidene fluoride-based polymer may be used by being physically or chemically redispersed in the dispersion medium. For example, water, a surfactant, a pH regulator, an anti-settling agent, a dispersion stabilizer, a corrosion inhibitor, an anti-fungal agent, and a wetting agent may be further added to the untreated latex, or impurities may be removed from the untreated latex by, for example, dialysis membrane or ion exchange resin.

Application of Vinylidene Fluoride-Based Polymer Composition

1. Resin Composition for Non-Aqueous Electrolyte Secondary Battery

The vinylidene fluoride-based polymer composition according to an embodiment of the present invention can be used for, for example, a resin composition for a non-aqueous electrolyte secondary battery. The resin composition for a non-aqueous electrolyte secondary battery according to an embodiment of the present invention (hereinafter, also referred to as "resin composition for a secondary battery") is only required to contain at least the vinylidene fluoride-based polymer composition described above, and may be formed only from the vinylidene fluoride-based polymer composition or may contain, for example, a water-soluble polymer, a filler, a solvent (dispersion medium), and various additives within a range that does not impair the object and effect of the present invention. In addition, the shape of the resin composition for a secondary battery may be a powder or liquid (for example, a colloidal shape or the like), or may be a bulk (such as a crumb shape) or the like.

Because the vinylidene fluoride-based polymer composition described above contains the vinylidene fluoride-based polymer described above, the resin composition for a secondary battery contains the vinylidene fluoride-based polymer. The amount of the vinylidene fluoride-based polymer contained in the resin composition for a secondary battery is appropriately selected according to the application of the resin composition for a secondary battery but, for example, can be set to 0.1 mass % or greater relative to the total amount of solid content of the resin composition for a secondary battery. When 0.1 mass % or greater of the vinylidene fluoride-based polymer is contained in the solid content of the resin composition for a secondary battery, the strength of the layer obtained from the resin composition for a secondary battery tends to be sufficiently high, and the adhesive strength relative to the constituent material of the non-aqueous electrolyte secondary battery tends to be sufficiently high. Note that, in the present specification, a component excluding a solvent or a dispersion medium from the resin composition for a secondary battery is referred to as "solid content of a resin composition for a secondary battery".

1-1. Vinylidene Fluoride-Based Polymer Composition

The vinylidene fluoride-based polymer composition according to an embodiment of the present invention is as described above. Here, the shape of the vinylidene fluoride-based polymer in the resin composition for a secondary battery is not particularly limited and for example, it may be dissolved in a solvent or may be contained in a particulate shape state (primary particle or secondary particle) in the resin composition for a secondary battery. In addition, in a case where the vinylidene fluoride-based polymer is in a solid state (for example, a particulate shape) in the resin composition for a secondary battery, the average particle size can be selected as appropriate depending on the application of the resin composition for a secondary battery and the state of the vinylidene fluoride-based polymer being contained in the resin composition for a secondary battery. For example, in a case where the resin composition for a secondary battery contains a dispersion medium and the vinylidene fluoride-based polymer is dispersed in the dispersion medium, the vinylidene fluoride-based polymer is mainly a primary particle. In this case, the average particle size (average primary particle size) is preferably from 10 nm to 700 nm, more preferably from 20 nm to 600 nm, and even more preferably from 30 nm to 500 nm. The primary particle size is calculated by the normalization analysis of a dynamic light scattering method. Specifically, the measurement is performed in accordance with JIS Z 8828. In addition, among the two large and small peaks obtained through the normalization analysis, the large peak is set as an average primary particle size.

On the other hand, when the shape of the resin composition for a secondary battery is powder, the vinylidene fluoride-based polymer is often a secondary particle. In this case, the average particle size (average secondary particle size) is preferably from 30 μm to 200 μm, more preferably from 35 μm to 190 μm, and even more preferably from 40 μm to 180 μm. The average secondary particle size is measured by a laser diffraction/scattering method and is calculated from the cumulative average diameter (d50) of the particle size distribution.

1-2. Other Components

The resin composition for a secondary battery may contain components besides the vinylidene fluoride-based polymer (other components), and examples thereof include a water-soluble polymer, a filler, a solvent (a dispersion medium), and various additives.

When the resin composition for a secondary battery contains a water-soluble polymer, the viscosity of the resin composition for a secondary battery is adjusted, and the dispersibility of the solid content of the resin composition for a secondary battery is enhanced. Examples of the water-soluble polymer include: cellulose compounds such as carboxymethyl cellulose (CMC), methyl cellulose, hydroxypropyl cellulose, hydroxypropyl methylcellulose, and hydroxyethyl cellulose; ammonium salts or alkali metal salts of the above-mentioned cellulose compounds; polycarboxylic acids such as poly(meth)acrylic acid and modified poly(meth)acrylic acid; alkali metal salts of the polycarboxylic acids; polyvinyl alcohol-based (co)polymers such as polyvinyl alcohol, modified polyvinyl alcohol, and ethylene-vinyl alcohol copolymer; and water-soluble polymers, including saponified compounds of copolymers of unsaturated carboxylic acids such as (meth)acrylic acid, maleic acid, and fumaric acid with polyvinylpyrrolidone, polyethylene oxide, polyvinyl butyral or vinyl ester. Among these, cellulose compounds and salts thereof are preferred. The resin composition for a secondary battery may contain only one type of water-soluble polymer or may contain two or more types thereof.

The amount of the water-soluble polymer is not particularly limited, and in one example, the amount can be set to from 0.01 mass % to 20 mass % with respect to the total amount of solid content of the resin composition for a secondary battery.

When the resin composition for a secondary battery contains a filler, the heat resistance and the ionic permeability of the layer obtained from the resin composition for a secondary battery can be improved. The filler may be an inorganic filler or an organic filler, and the inorganic filler is preferable from the perspective of the heat resistance of the layer obtained from the resin composition for a secondary battery. Examples of the inorganic filler include oxides such as silicon dioxide ($SiO_2$), alumina ($Al_2O_3$), titanium dioxide ($TiO_2$), calcium oxide (CaO), strontium oxide (SrO), barium oxide (BaO), magnesium oxide (MgO), zinc oxide (ZnO), and barium titanate ($BaTiO_3$); hydroxides such as magnesium hydroxide ($Mg(OH)_2$), calcium hydroxide ($Ca(OH)_2$), zinc hydroxide ($Zn(OH)_2$), aluminum hydroxide ($Al(OH)_3$), and aluminum hydroxide oxide (AlO(OH)); carbonates such as calcium carbonate ($CaCO_3$); sulfates such as barium sulfate; nitrides; clay minerals; and boehmite. The resin composition for a secondary battery may contain only one type of filler or may include two or more types thereof. From the perspective of the safety of secondary battery and the safety of the resin composition for a secondary battery, as the filler, alumina, silicon dioxide, magnesium oxide, magnesium hydroxide, magnesium carbonate, zinc oxide, and boehmite are preferably contained.

The average particle size of the fillers is preferably from 5 nm to 2 μm and more preferably from 10 nm to 1 μm. The average particle size is measured in accordance with JIS Z 8828. Here, the amount of the filler is preferably from 10 to 900 mass % relative to the total amount of the vinylidene fluoride-based polymer in the resin composition for a secondary battery.

The resin composition for a secondary battery may contain a dispersion medium for dispersing, for example, the vinylidene fluoride-based polymer. The dispersion medium is preferably water, but a non-aqueous solvent that does not dissolve the vinylidene fluoride-based polymer and can disperse, suspend, or emulsify can also be preferably used. Examples of the non-aqueous solvent include: amide compounds such as dimethylformamide, and N,N-dimethylacetamide; hydrocarbons such as toluene, xylene, n-dodecane, and tetralin; alcohols such as methanol, ethanol, isopropyl alcohol, 2-ethyl-1-hexanol, 1-nonanol, and lauryl alcohol; ketones such as acetone, methyl ethyl ketone, cyclohexanone, holon, acetophenone, and isophorone; esters such as benzyl acetate, isopentyl butyrate, methyl lactate, ethyl lactate, and butyl lactate; amine compounds such as o-toluidine, m-toluidine, and p-toluidine; lactones such as γ-butyrolactone and δ-butyrolactone; sulfoxide or sulfone compounds such as dimethyl sulfoxide, and sulfolane. These water or non-aqueous solvents may be used alone, or as a mixed solvent in which water and non-aqueous solvents are mixed. At this time, two or more types of non-aqueous solvents may be combined.

The resin composition for a secondary battery may contain a solvent for dissolving the vinylidene fluoride-based polymer. In this case, for example, the solvent is preferably N-methylpyrrolidone; however, the solvent is not particularly limited as long as it is a solvent that can dissolve at least a part of the vinylidene fluoride-based polymer and that can disperse, suspend, or emulsify the filler without dissolving the filler. These solvents may be formed of only one type or may be a mixed solvent in which two or more types of solvents are mixed.

In a case of using the dispersion medium or solvent, the amount of the dispersion medium or solvent in the resin composition for a secondary battery is preferably from 60 to 3500 parts by mass relative to 100 parts by mass of the vinylidene fluoride-based polymer. In addition, the amount of the solvent (dispersion medium) is not particularly limited and is preferably from 30 parts by mass to 99 parts by mass and more preferably from 35 to 98 parts by mass, with respect to the total amount of the resin composition for a secondary battery.

Examples of various additives include a dispersion stabilizer, a pH regulator, a thickener, an anti-settling agent, a corrosion inhibitor, an anti-fungal agent, and a wetting agent. A known compound can be used as the various additives. Examples of the dispersion stabilizer include the above-described surfactants (emulsifiers used in the preparation of the vinylidene fluoride-based polymer described above). Examples of the pH regulator include an electrolyte substance having a buffer capacity such as disodium hydrogen phosphate, sodium dihydrogen phosphate, and potassium dihydrogen phosphate; and a basic substance such as sodium hydroxide, potassium hydroxide, barium hydroxide, calcium hydroxide, and ammonia. These amounts are appropriately selected within a range that does not impair the object and effect of the present invention.

1-3. Method for Producing Resin Composition for Secondary Battery and Application of Resin Composition for Secondary Battery The resin composition for a secondary battery described above can be prepared by mixing the vinylidene fluoride-based polymer composition according to an embodiment of the present invention with other components as necessary. The method for mixing these is not particularly limited, and mixing can be performed by a known method.

For example, in a case where the vinylidene fluoride-based polymer (particles) is in a state being dispersed in the dispersion medium in the resin composition for a secondary battery, the vinylidene fluoride-based polymer particles and the dispersion medium obtained by the emulsion polymerization method described above may be used as is as the resin composition for a secondary battery. Alternatively, the vinylidene fluoride-based polymer particles obtained by the emulsion polymerization described above may be pulverized, mixed with other components or the like as necessary, and then physically or chemically redispersed in a separately prepared dispersion medium, and thus used as the resin composition for a secondary battery. Examples of methods for pulverization include, but are not limited to, methods such as salting-out, freeze milling, spray drying, and freeze drying.

On the other hand, when the vinylidene fluoride-based polymer is dissolved in a solvent in the resin composition for a secondary battery, the vinylidene fluoride-based polymer particles obtained by the emulsion polymerization described above may be pulverized and then dissolved in a solvent, and thus used as the resin composition for a secondary battery. The pulverizing method can be the same as described above, but is not limited thereto.

In addition, when the resin composition for a secondary battery is a powder, the vinylidene fluoride-based polymer particles obtained by the emulsion polymerization described above may be pulverized and used as is as the resin composition for a secondary battery or may be mixed with other components or the like as necessary, and this mixture may be used as the resin composition for a secondary battery. The pulverizing method can be the same as described above, but is not limited thereto.

2. Separator for Non-Aqueous Electrolyte Secondary Battery

The separator for a non-aqueous electrolyte secondary battery according to an embodiment of the present invention (hereinafter, also simply referred to as "separator") includes a separator film and a resin layer disposed on at least one surface of the separator film, in which the resin layer contains at least a solid content of the resin composition for a secondary battery. However, in a case where the resin layer itself can serve as a separator, the separator may not include the separator film.

2-1. Separator Film

The separator film can be set as a film which is electrically stable and has no electrical conductivity. A porous substrate having pores or voids inside is used for the separator, and it is preferable that the separator is a porous substrate having excellent ionic permeability. Examples of the porous substrate include polyolefin-based polymers (e.g., polyethylene or polypropylene), polyester-based polymers (e.g., polyethylene terephthalate), polyimide-based polymers (e.g., aromatic polyamide polymers or polyetherimides), polyether sulfones, polysulfone, polyether ketone, polystyrene, polyethylene oxides, polycarbonates, polyvinyl chlorides, polyacrylonitriles, polymethyl methacrylates, ceramics, and a porous film of a single layer or multilayer obtained by mixtures of at least two types thereof; nonwoven fabric; glass; and paper. Note that the polymer may be a modified product.

The material for the separator film is preferably polyolefin-based polymers (e.g., polyethylene or polypropylene). From the perspective of the shutdown function, polyethylene is more preferably contained. From the perspective of providing shutdown function and heat resistance in a compatible manner, 95 mass % or greater of polyethylene and 5 mass % or less of polypropylene is even more preferably contained.

Examples of the separator film formed from a polyolefin-based polymer includes: a single-layered polypropylene separator, a single-layered polyethylene separator, a three-layered polypropylene/polyethylene/polypropylene separator, and the like that are commercially available as Celgard (trade name, available from Polypore Corporation).

The thickness of the separator film (porous substrate) is preferably 3 μm or greater and 25 μm or less, and more preferably 5 μm or greater and 25 μm or less, from the perspectives of the mechanical properties and the internal resistance.

The surface of the separator film (porous substrate) may be subjected to a corona treatment, a plasma treatment, a flame treatment, or an ultraviolet irradiation treatment in order to enhance the adhesion to a resin layer (or the wettability of the resin composition for a secondary battery described above).

2-2. Resin Layer

The resin layer is only required to contain the solid content of the resin composition for a secondary battery described above and may further contain other components as necessary. The resin layer may be a layer for enhancing the strength of the separator, may be a layer for binding the separator and the electrode, or may be a layer that simultaneously serves these functions. In the resin layer, the vinylidene fluoride-based polymer described above may be in a particulate form, may be in a film form (including a porous film), or may be in a gel form containing a solvent.

The amount of the vinylidene fluoride-based polymer in the resin layer is preferably 10 mass % or greater and 100 mass % or less. When the amount of the vinylidene fluoride-based polymer is within this range, the adhesion between the resin layer and the separator film tends to increase, the adhesion between the resin layer and the electrode tends to increase, the strength of the separator tends to increase, and the strength of the resin layer itself tends to increase. The thickness of the resin layer is appropriately selected according to the function of the resin layer and is not particularly limited.

The method for forming the resin layer is not particularly limited, and for example, in a case where the resin composition for a secondary battery described above is a liquid (including a solvent or a dispersion medium), the resin layer can be formed by applying the resin composition for a secondary battery and then drying the solvent or dispersion medium. Note that, as necessary, any component may be added to the resin composition for a secondary battery, and this may be applied. On the other hand, in a case where the shape of the resin composition for a secondary battery is a powder or a bulk, the resin composition for a secondary battery is mixed with a solvent (dispersion medium) or other components as necessary, and the mixed solution is applied. Then, it can be formed by drying the solvent (dispersion medium) from the coating film. The method for applying these is not particularly limited and, for example, a doctor blade method, a reverse roll method, a comma bar method, a gravure method, an air knife method, a die coating method, and a dip coating method can be applied.

In addition, when drying the resin layer formed of the resin composition for a secondary battery, it is preferably performed to such a degree that at least a part of the solvent (dispersion medium) in the resin layer can be removed. The drying may be performed for multiple times at various temperatures and during the drying, pressure may be applied. After the drying, heat treatment may be further performed. For example, the drying temperature is preferably from 40° C. to 150° C. and more preferably 45° C. to 130° C., and the drying time can be set from 1 minute to 15 hours.

The resin layer may be disposed on at least one surface or on both surfaces of the separator provided between a negative electrode layer and a positive electrode layer.

3. Electrode for Non-Aqueous Electrolyte Secondary Battery

According to the present invention, an electrode for a secondary battery includes a current collector and an electrode mixture layer disposed on the current collector, in which the electrode mixture layer may contain at least a solid content of a resin composition for an electrode mixture layer, which will be described later. The electrode for a secondary battery may be for a positive electrode or for a negative electrode.

3-1. Current Collector

The current collector for the negative electrode and the positive electrode is a terminal for producing electricity. The material of the current collector is not particularly limited, and metal foil such as aluminum, copper, iron, stainless steel, steel, nickel, and titanium; or metal steel can be used as the material of the current collector. Furthermore, the surface of another medium may be coated with the above metal foil, metal steel, or the like.

3-2. Resin Composition for Electrode Mixture Layer and Electrode Mixture Layer

On the other hand, the electrode mixture layer can be a layer in which the resin composition for a secondary battery described above is mixed with the electrode active material to prepare a resin composition for an electrode mixture layer, and the resin composition for an electrode mixture layer can be applied on the current collector and dried. The electrode mixture layer may be formed only on one surface of the current collector and is preferably disposed on both surfaces.

Here, the electrode mixture layer may be a layer for binding the current collector and the active material, may be a layer for binding the active materials to each other, may be a layer for binding the active material and the other components, or may be a layer for binding the secondary battery electrode and the separator described above. In the electrode mixture layer, the vinylidene fluoride-based polymer in the resin composition for a secondary battery described above may be in a particulate form, may be in a film from (including a porous film), or may be in a gel form containing a solvent.

The electrode mixture layer may contain, for example, the solid content of the resin composition for a secondary battery described above; and the electrode active material and may contain other components as necessary. Examples of the other component include a conductive auxiliary agent, a solid electrolyte, a pigment dispersant, and an adhesion auxiliary agent.

The amount of the vinylidene fluoride-based polymer relative to the total amount of the electrode mixture layer is preferably 0.1 mass % or greater and 50 mass % or less, more preferably 0.2 mass % or greater and 40 mass % or less, and even more preferably 0.3 mass % or greater and 30 mass % or less. When the amount of the vinylidene fluoride-based polymer is within this range, adhesion between the electrode mixture layer and the current collector, for example, tends to be favorable.

The electrode active material contained in the electrode mixture layer is not particularly limited. For example, a known electrode active material for the negative electrode (negative electrode active material) or electrode active material for the positive electrode (positive electrode active material) can be used.

Examples of the negative electrode active material include carbon materials such as artificial graphites, natural graphites, non-graphitizable carbon, graphitizable carbon, activated carbon, phenol resins, and carbonized pitch by calcination; metals and alloy materials such as Cu, Li, Mg, B, Al, Ga, In, Si, Ge, Sn, Pb, Sb, Bi, Cd, Ag, Zn, Hf, Zr and Y; and metal oxides such as GeO, $GeO_2$, SnO, $SnO_2$, PbO, and $PbO_2$. Note that the negative electrode active material may be a commercially available product.

On the other hand, a lithium-based positive electrode active material containing at least lithium is preferable as an active material for a positive electrode. Examples of the lithium-based positive electrode active material include: complex metal chalcogenide compounds represented by the general formula $LiMY_2$ (where M is at least one or more of transition metals such as Co, Ni, Fe, Mn, Cr, or V, and Y is a chalcogen element such as O or S) such as $LiCoO_2$ or $LiNi_xCo_{1-x}O_2$ ($0<x\leq1$); complex metal oxides having a spinel structure such as $LiMn_2O_4$; and olivine-type lithium compounds such as $LiFePO_4$. Note that the positive electrode active material may be a commercially available product.

In addition, the conductive auxiliary agent is not particularly limited as long as the conductive auxiliary is a compound capable of further enhancing electrical conductivity between electrode active materials or between an electrode active material and a current collector. Examples of the conductive auxiliary agent include acetylene black, Ketjen black, carbon black, graphite powder, carbon nanofibers, carbon nanotubes, and carbon fibers.

The amount of the conductive auxiliary agent can be optionally set depending on the type and the type of the battery. From the perspective of enhancing conductivity and increasing dispersibility of the conductive auxiliary agent, in one example, the amount of the conductive auxiliary agent is preferably 0.1 mass % or greater and 15 mass % or less, more preferably 0.1 mass % or greater and 7 mass % or less, and even more preferably 0.1 mass % or greater and 5 mass % or less, relative to the total amount of the electrode active material, the vinylidene fluoride-based polymer, and the conductive auxiliary agent.

The solid electrolyte is not particularly limited as long as the solid electrolyte is a solid compound having ionic conductivity, and a known inorganic solid electrolyte and a polymer solid electrolyte can be used. Examples of the inorganic solid electrolyte include an oxide-based solid electrolyte, a sulfide-based solid electrolyte, a nitride-based solid electrolyte, and a complex hydride solid electrolyte. Examples of the polymer solid electrolyte include a gel-based electrolyte and an intrinsic polymer electrolyte.

Examples of the oxide-based solid electrolyte include, but are not limited to, perovskite-type LLTO, garnet-type LLZ, a NASICON-type compound, a LISICON-type compound, a LIPON-type compound, and a β-alumina-type compound. Specific examples include: $Li_3PO_4$, $Li_{0.34}La_{0.51}TiO_3$, $Li_{1.3}Al_{0.3}Ti_{1.7}(PO_4)_3$, $Li_7La_3Zr_2O_{12}$, $Li_6BaLa_2Ta_2O_{12}$, $Li_{2.9}PO_{3.3}N_{0.46}$, $Li_{4.3}Al_{0.3}Si_{0.7}O_4$, $50Li_4SiO_4\text{-}50Li_3BO_3$, $Li_2O\text{—}Al_2O_3\text{—}SiO_2\text{—}P_2O_5\text{—}TiO_2$, and $Li_{1.5}Al_{0.5}Ge_{1.5}(PO_4)_3\text{-}0.05Li_2O$.

Examples of the sulfide-based solid electrolyte include, but are not limited to, a LGPS-type compound, an aldyrodite-type compound, an amorphous-based compound, and a Li—P—S-based compound. Specific examples thereof include $Li_{10}GeP_2S_{12}$, $Li_{3.25}Ge_{0.25}P_{0.75}S_4$, $0.03Li_3PO_4\text{-}0.59Li_2S\text{-}0.38SiS_2$, $57Li_2S\text{-}38SiS_2\text{-}5Li_3PO_4$, $70Li_2S\text{-}30P_2S_5$, and $Li_7P_3S_{11}$.

Specific examples of the nitride-based solid electrolyte include, but are not limited to, $LiN_3$.

Specific examples of the complex hydride solid electrolyte include, but are not limited to, $LiBH_4$.

Specific examples of the gel-based electrolyte include, but are not limited to, poly(ethylene oxide)$_8$-$LiClO_4$(ethylene carbonate (EC)+propylene carbonate (PC)), poly(ethylene oxide)$_8$-$LiClO_4$(PC), poly(vinylidene fluoride)-LiN$(CF_3SO_2)_2$(EC+PC), poly(vinylidene fluoride-co-hexafluoropropylene)-$LiPF_6$(EC+diethyl carbonate (DEC)+dimethyl carbonate (DMC)), poly(ethylene glycol acrylate)-$LiClO_4$ (PC), and poly(acrylonitrile)-$LiClO_4$(EC+PC) poly(methyl methacrylate)-$LiClO_4$(PC).

Specific examples of the intrinsic polymer electrolytes include, but are not limited to, poly(ethylene oxide)$_8$-$LiClO_4$, poly(oxymethylene)-$LiClO_4$, poly(propylene oxide)$_8$-$LiClO_4$, poly(dimethyl siloxane)-$LiClO_4$, poly(vinylidene fluoride-co-hexafluoropropylene)-LiTFSI, poly(2,2-dimethoxypropylene carbonate)-LiFSI, and poly[(2-methoxy)ethylglycidyl ether]$_8$-$LiClO_4$.

These solid electrolytes may contain only one type or two or more types of the electrolytes.

Examples of the pigment dispersant include polyvinylpyrrolidone. Examples of the adhesion auxiliary agent include cellulose compounds such as polyacrylic acid, polymethacrylic acid, polyimide, carboxymethylcellulose; and an ammonium salt and an alkali metal salt of the cellulose compound. These amounts are not particularly limited as long as the amounts are within the range that does not impair the object and effect of the present invention.

Examples of other resins include vinylidene fluoride-based polymers other than the vinylidene fluoride-based polymer described above, polytetrafluoroethylene (PTFE), styrene-butadiene rubber (SBR), and polyacrylonitrile (PAN). The content of the other resin is not particularly limited as long as it does not impair the object and effect of the present invention.

Here, the thickness of the electrode mixture layer is not particularly limited and can be any thickness. In the electrode, the electrode mixture layer may be provided in contact with the above separator.

The electrode mixture layer can be formed by applying, onto a current collector, and drying a resin composition for an electrode mixture layer in which the resin composition for a secondary battery or an electrode active material is mixed with a solvent (dispersion medium) or a thickener as necessary.

The solvent (dispersion medium) is not particularly limited, and the solvent (dispersion medium) described in the resin composition for a secondary battery can be used. These solvents (dispersion medium) may contain only one type or two or more types thereof.

Additionally, a known compound can be used as the thickener, and the amount thereof is appropriately selected based on the viscosity of the resin composition for an electrode mixture layer.

The method for forming the electrode mixture layer is not particularly limited, and for example, when the above-described resin composition for a secondary battery is a liquid (including a solvent or a dispersion medium), the electrode mixture layer may be formed by applying and drying the resin composition for an electrode mixture layer obtained by mixing the electrode active material with the resin composition for a secondary battery. Note that, as necessary, any component may be added besides the resin composition for a secondary battery and the electrode active material, and this may be applied. On the other hand, in a case where the shape of the resin composition for a secondary battery is a powder or a bulk, the resin composition for an electrode mixture layer is prepared by mixing the resin composition for a secondary battery and the electrode active material with a solvent (dispersion medium) or other components as necessary. Then, the electrode mixture layer can be formed by applying and drying the resin composition for an electrode mixture layer. The method for applying these is not particularly limited and, for example, a doctor blade method, a reverse roll method, a comma bar method, a gravure method, an air knife method, a die coating method, and a dip coating method can be applied. Furthermore, after application, it is common to heat the resin composition for an electrode mixture layer at any temperature and dry the solvent. The drying may be performed for multiple times at various temperatures. During the drying, pressure may be applied. After the drying, heat treatment may be further performed. In one example, the heat treatment is performed at from 100° C. to 300° C. for from 10 seconds to 300 minutes.

After the coating and drying, press treatment may be further performed. In one example, the press treatment is performed at from 1 MPa to 200 MPa. By performing the press treatment, electrode density can be enhanced.

4. Non-Aqueous Electrolyte Secondary Battery

The non-aqueous electrolyte secondary battery according to an embodiment of the present invention may include a separator including at least a positive electrode and a negative electrode and disposed between the positive electrode and the negative electrode. The non-aqueous electrolyte secondary battery includes an electrode for a non-aqueous electrolyte secondary battery described above as a positive electrode and/or a negative electrode. Furthermore, as the separator, the separator for a non-aqueous electrolyte secondary battery described above may be included.

In the non-aqueous electrolyte secondary battery, the positive electrode, the negative electrode, and the electrolyte are typically combined. The electrolyte can be, for example, a liquid in which an electrolyte is dissolved in a non-aqueous solvent. Examples of the non-aqueous solvent include cyclic carbonates such as propylene carbonate (PC), ethylene carbonate (EC), butylene carbonate, fluoroethylene carbonate, and difluoroethylene carbonate; chain carbonates such as dimethyl carbonate (DMC), diethyl carbonate (DEC), ethyl methyl carbonate (EMC), and fluorine substitutions thereof; cyclic esters such as γ-butyrolactone and γ-valerolactone; dimethoxyethane; diethoxyethane; tetrahydrofuran; 2-methyl tetrahydrofuran; sulfolane; and 1,3-dioxolane. These non-aqueous solvents can be used alone or in combination of two or more types. The vinylidene fluoride-based polymer in the above-described resin composition for a secondary battery is hardly swelled or dissolved by these non-aqueous solvents and thus can be a highly stable non-aqueous electrolyte secondary battery.

In addition, an ionic liquid can also be used as the electrolyte. The ionic liquid is not particularly limited, and a known ionic liquid can be used, and examples thereof include an ethyl methyl imidazolium salt and a butyl methyl imidazolium salt. The ionic liquid may be dissolved in the non-aqueous solvent described above and may be used as is.

Furthermore, the electrolyte may also be used as a solid without being dissolved in the non-aqueous solvent. The electrolyte used in the secondary battery according to the present embodiment is not particularly limited. For example, a known electrolyte in the secondary battery can be used. Examples of the electrolyte include $LiClO_4$, $LiPF_6$, $LiBF_4$, $LiCF_3SO_3$, $LiAsF_6$, $LiCl$, $LiBr$, $LiB(C_6H_5)_4$, $LiSbF_6$, $LiC_4F_9SO_3$, $Li(CF_3SO_2)_3C$, $LiBPh_4$, $LiN(SO_3CF_3)_2$, $Li(FSO_2)_2N$ (LiFSI), and $Li(CF_3SO_2)_2N$ (LiTFSI).

The non-aqueous electrolyte secondary battery according to an embodiment of the present invention may include a middle layer provided in between a positive electrode and a negative electrode, a middle layer provided in between a positive electrode and a separator, and/or a middle layer provided in between a negative electrode and a separator, and the middle layers may contain other components as necessary. Examples of such other components include water-soluble polymers or fillers, solid electrolytes, pigment dispersants, and adhesion auxiliary agents. Such a middle layer can be produced by using the vinylidene fluoride-based polymer composition according to an embodiment of the present invention.

EXAMPLES

The present invention will be described in further detail hereafter based on Examples and Comparative Examples, but the present invention is not limited to the following examples.

Production Method

Example 1

To an autoclave was added 380 parts by mass of ion-exchanged water and degassed by nitrogen bubbling for 30 minutes. Then, 0.25 parts by mass of disodium hydrogenphosphate and 0.0019 parts by mass of EMULGEN (series trade name; available from Kao Corporation; the same applies hereinafter) LS-110 were charged, and pressure was applied to 6.5 MPa, and nitrogen purge was performed 3 times. Then, 0.2 parts by mass of ethyl acetate, 28 parts by mass of vinylidene fluoride (VDF), and 7 parts by mass of hexafluoropropylene (HFP) were added to the autoclave. The temperature was raised to 80° C. while stirred. Then, a 5 mass % ammonium persulfate aqueous solution was added so that the ammonium persulfate amount became 0.1 parts by mass, and then polymerization was started. An in-can pressure at this time was set to 2.5 to 5 MPa. After initiating the reaction, when the in-can pressure was dropped to 2.5 MPa, 65 parts by mass of VDF was continuously added so that the in-can pressure was maintained to 2.5 MPa. Note that, in a case where the in-can pressure at the beginning of the reaction was 2.5 MPa, 65 parts by mass of VDF was continuously added from the beginning of the reaction so that the in-can pressure was maintained at 2.5 MPa. After initiating the reaction, when 50 mass % or greater of the continuously added VDF was added, 0.06 parts by mass of monomethyl maleate (MMM) was added in a form of 5 mass % aqueous solution. After completion of the continuous addition of VDF, the polymerization was completed when the pressure was dropped to 1.5 MPa, and a latex (aqueous dispersion of the vinylidene fluoride-based polymer composition) was obtained. The solid content concentration of the obtained latex (concentration of vinylidene fluoride-based polymer) was 19.1 mass %.

Example 2

A latex was obtained by performing polymerization in the same manner as in Example 1 except for changing the amount of EMULGEN LS-110 from 0.0019 parts by mass to 0.003 parts by mass. The solid content concentration of the obtained latex was 19.2 mass %.

Example 3

A latex was obtained by performing polymerization in the same manner as in Example 2 except for changing the amount of MMM from 0.06 parts by mass to 0 parts by mass. The solid content concentration of the obtained latex was 20.0 mass %.

Example 4

A latex was obtained by performing polymerization in the same manner as in Example 3 except for changing the amount of VDF added in an autoclave before the start of polymerization from 28 parts by mass to 10 parts by mass, the amount of HFP from 7 parts by mass to 35 parts by mass, and the amount of VDF added continuously to maintain the in-can pressure at 2.5 MPa from 65 parts by mass to 55 parts by mass. The solid content concentration of the obtained latex was 19.4 mass %.

Example 5

A latex was obtained by performing polymerization in the same manner as in Example 3 except for changing the amount of the ion-exchanged water from 380 parts by mass to 760 parts by mass, the amount of the EMULGEN LS-110 from 0.003 parts by mass to 0.007 parts by mass, the amount of VDF added in an autoclave before the start of polymerization from 28 parts by mass to 30 parts by mass, the amount of HFP from 7 parts by mass to 0 parts by mass, and the amount of VDF added continuously to maintain the in-can pressure at 2.5 MPa from 65 parts by mass to 70 parts by mass. The solid content concentration of the obtained latex was 10.7 mass %.

Example 6

A latex was obtained by performing polymerization in the same manner as in Example 1 except for changing the surfactant from EMULGEN LS-110 to EMULGEN LS-106 and changing the amount of the surfactant from 0.0019 parts by mass to 0.007 parts by mass. The solid content concentration of the obtained latex was 19.2 mass %.

Example 7

A latex was obtained by performing polymerization in the same manner as in Example 6 except for changing the surfactant from EMULGEN LS-106 to EMULGEN LS-114. The solid content concentration of the obtained latex was 19.2 mass %.

Example 8

A latex was obtained by performing polymerization in the same manner as in Example 1 except for changing the amount of EMULGEN LS-110 from 0.0019 parts by mass to 0.007 parts by mass. The solid content concentration of the obtained latex was 19.1 mass %.

Example 9

A latex was obtained by performing polymerization in the same manner as in Example 3 except for changing the amount of VDF added in an autoclave before the start of polymerization from 28 parts by mass to 30 parts by mass, the amount of HFP from 7 parts by mass to 0 parts by mass, and the amount of VDF added continuously to maintain the in-can pressure at 2.5 MPa from 65 parts by mass to 70 parts by mass. The solid content concentration of the obtained latex was 19.0 mass %.

Example 10

A latex was obtained by performing polymerization in the same manner as in Example 8 except for using 0.06 parts by mass of acrylic acid (AA) in place of 0.06 parts by mass of the MMM. The solid content concentration of the obtained latex was 19.4 mass %.

Example 11

A latex was obtained by performing polymerization in the same manner as in Example 8 except for using 0.06 parts by mass of acryloyloxypropyl succinic acid (APS) in place of 0.06 parts by mass of the MMM. The solid content concentration of the obtained latex was 19.4 mass %.

Comparative Example 1

A latex was obtained by performing polymerization in the same manner as in Example 1 except for using 0.5 parts by mass of ammonium perfluorooctanoate (PFOA) in place of 0.0019 parts by mass of the EMULGEN LS-110 as the surfactant. The solid content concentration of the obtained latex was 20.4 mass %.

COMPARATIVE EXAMPLE 1

A latex was obtained by performing polymerization in the same manner as in Example 1 except for using 0.5 parts by mass of ammonium perfluorooctanoate (APFO) in place of 0.0019 parts by mass of the EMULGEN LS-110 as the surfactant. The solid content concentration of the obtained latex was 20.4 mass %.

Comparative Example 3

When polymerization was performed in the same manner as in Example 1 except for changing the amount of EMULGEN LS-110 from 0.0019 parts by mass to 0 parts by mass, no latex was obtained.

Comparative Example 4

When polymerization was performed in the same manner as in Example 5 except for changing the amount of EMULGEN LS-110 from 0.007 parts by mass to 0 parts by mass, no latex was obtained.

Comparative Example 5

A latex was obtained by performing polymerization in the same manner as in Example 1 except for changing the amount of EMULGEN LS-110 from 0.0019 parts by mass to 0.0089 parts by mass. The solid content concentration of the obtained latex was 19.1 mass %.

Comparative Example 6

When polymerization was performed in the same manner as in Example 6 except for changing the surfactant from EMULGEN LS-110 to Pluronic (series trade name; available from BASF; the same applies hereinafter) 31R1, no latex was obtained.

Comparative Example 7

A latex was obtained by performing polymerization in the same manner as in Example 3 except for changing the amount of EMULGEN LS-110 from 0.003 parts by mass to 0.0095 parts by mass. The solid content concentration of the obtained latex was 19.7 mass %.

Comparative Example 8

A latex was obtained by performing polymerization in the same manner as in Example 9 except for changing the amount of EMULGEN LS-110 from 0.003 parts by mass to 0.0095 parts by mass. The solid content concentration of the obtained latex was 19.0 mass %.

Evaluation Method

Solid Content Concentration

The concentration (solid content concentration) of the vinylidene fluoride-based polymer in the latex was calculated by placing approximately 5 g of the latex obtained by the polymerization in an aluminum cup, drying at 80° C. for 3 hours, and measuring mass before and after the drying.

Polymerization Stability

For the polymerization stability of the latex (aqueous dispersion of the vinylidene fluoride-based polymer composition), the case where aggregates of the vinylidene fluoride-based polymer composition were not ejected at the time when the unreacted monomers were removed from the autoclave by purge after the completion of the polymerization was evaluated as "○" (good), and the case where aggregates of the vinylidene fluoride-based polymer composition were ejected was evaluated as "x" (Poor).

Yield

The yield of the vinylidene fluoride-based polymer in the latex (aqueous dispersion of the vinylidene fluoride-based polymer composition) was calculated by the following equation.

$$\text{Yield [\%]} = \frac{\text{Latex mass [g]} \times \dfrac{\text{Solid content concentration [\%]}}{100}}{\text{Total mass of monomer, ethyl acetate, disodium hydrogenphosphate, and ammonium persulfate [g]}} \quad \text{(Equation 1)}$$

Foaming Characteristic

The latex was filled to 30 mm height in a 100 cc vial, and a nitrogen gas was supplied at a flow rate of 2 L/min for 1 minute by using a φ 1 mm syringe needle. The foaming percentage was calculated by the following equation based on the height of the liquid layer of the latex before and after the gas supply. The case where the foaming percentage at this time was 10% or less was evaluated as causing less foaming.

$$\text{Foaming percentage [\%]} = \frac{\text{Height of liquid layer of latex before air supply [mm]} - \text{Height of liquid layer of latex after air supply [mm]}}{\text{Height of liquid layer of latex before air supply [mm]}} \times 100 \quad \text{(Equation 2)}$$

Surfactant Amount Relative to Polymer

The surfactant amount relative to the polymer was calculated by the following equation based on the yield of the vinylidene fluoride-based polymer in the latex (aqueous dispersion of the vinylidene fluoride-based polymer composition).

$$\text{Surfactant amount relative to polymer [mass ppm]} = \frac{\text{Surfactant amount relative to monomer [mass ppm]}}{\dfrac{\text{Yield [\%]}}{100}} \quad \text{(Equation 3)}$$

The results are shown in Table 1. Note that the data related to the surfactants and other surfactants used in Examples and Comparative Examples are shown in Table 2.

TABLE 1

| | Surfactant amount [mass ppm] | | VDF/HFP/modified monomer | | | | Yield | |
|---|---|---|---|---|---|---|---|---|
| | Relative to polymer | Relative to monomer | Charged composition [part by mass] | Modified monomer | Surfactant | Polymerization stability | (Polymer in latex) [%] | Foaming percentage [%] |
| Example 1 | 21 | 19 | 93/7/0.06 | MMM | Non-fluorinated/LS-110 | ○ | 88.9 | 0 |
| Example 2 | 34 | 30 | 93/7/0.06 | MMM | Non-fluorinated/LS-110 | ○ | 89.2 | 3.3 |
| Example 3 | 31 | 30 | 93/7/0 | No | Non-fluorinated/LS-110 | ○ | 94.9 | 3.3 |
| Example 4 | 33 | 30 | 65/35/0 | No | Non-fluorinated/LS-110 | ○ | 91.0 | 3.3 |
| Example 5 | 77 | 70 | 100/0/0 | No | Non-fluorinated/LS-110 | ○ | 90.6 | 6.7 |
| Example 6 | 79 | 70 | 93/7/0.06 | MMM | Non-fluorinated/LS-106 | ○ | 88.5 | 6.7 |
| Example 7 | 79 | 70 | 93/7/0.06 | MMM | Non-fluorinated/LS-114 | ○ | 88.6 | 6.7 |
| Example 8 | 79 | 70 | 93/7/0.06 | MMM | Non-fluorinated/LS-110 | ○ | 88.4 | 6.7 |
| Example 9 | 32 | 30 | 100/0/0 | No | Non-fluorinated/LS-110 | ○ | 93.1 | 6.7 |
| Example 10 | 77 | 70 | 93/7/0.06 | AA | Non-fluorinated/LS-110 | ○ | 90.8 | 6.7 |
| Example 11 | 77 | 70 | 93/7/0.06 | APS | Non-fluorinated/LS-110 | ○ | 90.5 | 6.7 |
| Comparative Example 1 | 5459 | 5000 | 93/7/0.06 | MMM | Fluorinated | ○ | 91.6 | 16.7 |
| Comparative Example 2 | 253 | 200 | 93/7/0.06 | MMM | Non-fluorinated/LS-110 | × | 78.7 | 16.7 |

TABLE 1-continued

|  | Surfactant amount [mass ppm] | | VDF/HFP/modified monomer | | | | Yield | |
| --- | --- | --- | --- | --- | --- | --- | --- | --- |
|  | Relative to polymer | Relative to monomer | Charged composition [part by mass] | Modified monomer | Surfactant | Polymerization stability | (Polymer in latex) [%] | Foaming percentage [%] |
| Comparative Example 3 | 0 | 0 | 93/7/0.06 | MMM | No | × | 0 | Unmeasurable |
| Comparative Example 4 | 0 | 0 | 100/0/0 | No | No | × | 0 | Unmeasurable |
| Comparative Example 5 | 100 | 90 | 93/7/0.06 | MMM | Non-fluorinated/LS-110 | ○ | 89.9 | 13.3 |
| Comparative Example 6 | — | 70 | 93/7/0.06 | MMM | Non-fluorinated/31R1 | × | 0 | Unmeasurable |
| Comparative Example 7 | 102 | 95 | 93/7/0 | No | Non-fluorinated/LS-110 | ○ | 93.4 | 13.3 |
| Comparative Example 8 | 103 | 95 | 100/0/0 | No | Non-fluorinated/LS-110 | ○ | 92.1 | 15.6 |

TABLE 2

| Surfactant | Chemical name | HLB value | Viscosity (25° C.) [mPa · s] | Mw*1 | Hydroxyl value [mg KOH/g] | MW calculated from hydroxyl value |
| --- | --- | --- | --- | --- | --- | --- |
| Pluronic 31R1 | Polyoxyethylene polyoxypropylene glycol (average number of hydroxyl groups per 1 molecule is 2) | 2 | 660 | 6400 | | |
| Pluronic 25R2 | | 4 | 680 | 5400 | 36 | 3117 |
| Pluronic L101 | | 4.5 | 800 | 7000 | | |
| EMULGEN LS-106 | Polyoxyethylene polyoxypropylene alkyl ether (average number of hydroxyl groups per 1 molecule is 1) | 12.5 | 46 | 1000 | 102 to 112 | 501 to 550 |
| EMULGEN LS-110 | | 13.4 | 78 | 1400 | 73 to 83 | 676 to 768 |
| EMULGEN LS-114 | | 14.0 | 111 | 1700 | 57 to 67 | 837 to 984 |

*1Mw measured by gel permeation chromatography (GPC), calibrated with polystyrene standard.

As clearly shown in Tables 1 and 2, the vinylidene fluoride-based polymer composition according to an embodiment of the present invention achieves excellent handleability because foaming is less likely to occur during use and contains no fluorinated surfactant. Furthermore, the method of producing a vinylidene fluoride-based polymer according to an embodiment of the present invention can provide a vinylidene fluoride-based polymer in high yield without using a fluorinated surfactant while excellent polymerization stability is maintained.

The invention claimed is:

1. A vinylidene fluoride-based polymer composition comprising a vinylidene fluoride-based polymer and a surfactant,
    the surfactant containing a segment of polyethylene glycol and a segment of polypropylene glycol,
    a content of the surfactant being 10 ppm or greater and less than 100 ppm in terms of mass relative to a solid content of the vinylidene fluoride-based polymer composition, and
    an HLB value of the surfactant being 10 or greater, but the vinylidene fluoride-based polymer composition containing no fluorinated surfactant.

2. The vinylidene fluoride-based polymer composition according to claim 1, wherein a weight average molecular weight of the surfactant is 2500 or less.

3. The vinylidene fluoride-based polymer composition according to claim 1, wherein
    the vinylidene fluoride-based polymer is a vinylidene fluoride-based copolymer containing a structural unit derived from vinylidene fluoride and a structural unit derived from a fluorine-containing alkyl vinyl compound, and
    a content of the structural unit derived from vinylidene fluoride is 60 mass % or greater and less than 100 mass % relative to a total amount of structural units in the vinylidene fluoride-based copolymer.

4. The vinylidene fluoride-based polymer composition according to claim 3, wherein the structural unit derived from a fluorine-containing alkyl vinyl compound is at least one selected from the group consisting of structural units derived from hexafluoropropylene, structural units derived from tetrafluoroethylene, and structural units derived from chlorotrifluoroethylene.

5. The vinylidene fluoride-based polymer composition according to claim 1, wherein the vinylidene fluoride-based polymer contains a structural unit derived from a compound represented by Formula (1):

[Chem. 1]

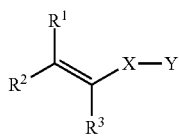

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

6. The vinylidene fluoride-based polymer composition according to claim 1, wherein
a weight average molecular weight of the surfactant is 2500 or less,
the vinylidene fluoride-based polymer is a vinylidene fluoride-based copolymer containing a structural unit derived from vinylidene fluoride and a structural unit derived from a fluorine-containing alkyl vinyl compound, and
a content of the structural unit derived from vinylidene fluoride is 60 mass % or greater and less than 100 mass % relative to a total amount of structural units in the vinylidene fluoride-based copolymer.

7. The vinylidene fluoride-based polymer composition according to claim 6, wherein the structural unit derived from a fluorine-containing alkyl vinyl compound is at least one selected from the group consisting of structural units derived from hexafluoropropylene, structural units derived from tetrafluoroethylene, and structural units derived from chlorotrifluoroethylene.

8. The vinylidene fluoride-based polymer composition according to claim 1, wherein
a weight average molecular weight of the surfactant is 2500 or less,
the vinylidene fluoride-based polymer contains a structural unit derived from a compound represented by Formula (1):

[Chem. 1]

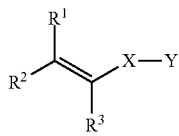

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

9. The vinylidene fluoride-based polymer composition according to claim 1, wherein
the vinylidene fluoride-based polymer is a vinylidene fluoride-based copolymer containing a structural unit derived from vinylidene fluoride and a structural unit derived from a fluorine-containing alkyl vinyl compound,
a content of the structural unit derived from vinylidene fluoride is 60 mass % or greater and less than 100 mass % relative to the total amount of structural units in the vinylidene fluoride-based copolymer, and
the vinylidene fluoride-based polymer contains a structural unit derived from a compound represented by Formula (1):

[Chem. 1]

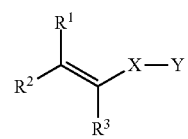

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

10. The vinylidene fluoride-based polymer composition according to claim 1, wherein
a weight average molecular weight of the surfactant is 2500 or less,
the vinylidene fluoride-based polymer is a vinylidene fluoride-based copolymer containing a structural unit derived from vinylidene fluoride and a structural unit derived from a fluorine-containing alkyl vinyl compound,
a content of the structural unit derived from vinylidene fluoride is 60 mass % or greater and less than 100 mass % relative to the total amount of structural units in the vinylidene fluoride-based copolymer, and
the vinylidene fluoride-based polymer contains a structural unit derived from a compound represented by Formula (1):

[Chem. 1]

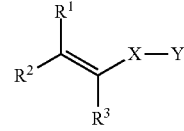

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

11. The vinylidene fluoride-based polymer composition according to claim 1, wherein
the vinylidene fluoride-based polymer is a vinylidene fluoride-based copolymer containing a structural unit derived from vinylidene fluoride and a structural unit derived from a fluorine-containing alkyl vinyl compound,
a content of the structural unit derived from vinylidene fluoride is 60 mass % or greater and less than 100 mass % relative to the total amount of structural units in the vinylidene fluoride-based copolymer,
the structural unit derived from a fluorine-containing alkyl vinyl compound is at least one selected from the group consisting of structural units derived from hexafluoropropylene, structural units derived from tetrafluoroethylene, and structural units derived from chlorotrifluoroethylene, and
the vinylidene fluoride-based polymer contains a structural unit derived from a compound represented by Formula (1):

[Chem. 1]

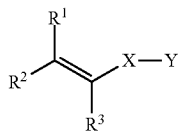

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

12. The vinylidene fluoride-based polymer composition according to claim 1, wherein
a weight average molecular weight of the surfactant is 2500 or less,
the vinylidene fluoride-based polymer is a vinylidene fluoride-based copolymer containing a structural unit derived from vinylidene fluoride and a structural unit derived from a fluorine-containing alkyl vinyl compound,
a content of the structural unit derived from vinylidene fluoride is 60 mass % or greater and less than 100 mass % relative to the total amount of structural units in the vinylidene fluoride-based copolymer,
the structural unit derived from a fluorine-containing alkyl vinyl compound is at least one selected from the group consisting of structural units derived from hexafluoropropylene, structural units derived from tetrafluoroethylene, and structural units derived from chlorotrifluoroethylene, and
the vinylidene fluoride-based polymer contains a structural unit derived from a compound represented by Formula (1):

[Chem. 1]

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

13. A method of producing a vinylidene fluoride-based polymer comprising emulsion polymerization of a monomer in a water-based medium in the presence of an emulsifier and an initiator without using a fluorinated surfactant,
the monomer containing vinylidene fluoride and containing or not containing at least one selected from the group consisting of fluorine-containing alkyl vinyl compounds and compounds represented by Formula (1),
the emulsifier being a surfactant containing a segment of polyethylene glycol and a segment of polypropylene glycol, and
a used amount of the emulsifier being 8.5 ppm or greater and less than 100 ppm in terms of mass relative to an amount of the monomer;

[Chem. 2]

(1)

where $R^1$ and $R^2$ each independently are a hydrogen atom, an alkyl group having from 1 to 5 carbons, a carboxyl group, or a carboxyl group substituted with an alkyl group having from 1 to 5 carbons, $R^3$ is a hydrogen atom or an alkyl group having from 1 to 5 carbons but $R^2$ and $R^3$ may be bonded to each other and form a ring, X is a single bond or an atomic group that has 1 to 20 atoms in a shortest molecular chain that links two moieties bonded to X and that has a molecular weight of 500 or less, and Y is a carboxyl group or a hydroxyl group.

* * * * *